United States Patent
Gockel et al.

(10) Patent No.: US 7,410,341 B2
(45) Date of Patent: Aug. 12, 2008

(54) INTERNALLY-COOLED SEAL HOUSING FOR TURBINE ENGINE

(75) Inventors: Richard R. Gockel, Mesa, AZ (US); John D. Robinson, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 442 days.

(21) Appl. No.: 11/159,453

(22) Filed: Jun. 22, 2005

(65) Prior Publication Data
US 2007/0025835 A1 Feb. 1, 2007

(51) Int. Cl.
F03B 11/00 (2006.01)
(52) U.S. Cl. .................... 415/110; 415/170.1
(58) Field of Classification Search ........ 415/110, 415/111, 112, 170.1; 277/318, 408, 927
See application file for complete search history.

(56) References Cited

U.S. PATENT DOCUMENTS

| | | | |
|---|---|---|---|
| 2,709,567 A | 5/1955 | Wood | |
| 3,895,811 A | 7/1975 | Richard, Jr. et al. | |
| 3,915,521 A | 10/1975 | Young | |
| 4,107,927 A | 8/1978 | Gordon, Jr. et al. | |
| 4,174,844 A | 11/1979 | Zobens | |
| 4,365,815 A | 12/1982 | Scott | |
| 4,621,981 A | 11/1986 | Lorett | |
| 4,749,199 A | 6/1988 | Gresh | |
| 4,993,917 A * | 2/1991 | Kulle et al. | 415/105 |
| 5,622,438 A | 4/1997 | Walsh et al. | |
| 5,639,096 A | 6/1997 | Ullah | |
| 5,813,830 A | 9/1998 | Smith et al. | |
| 6,330,790 B1 * | 12/2001 | Arora et al. | 415/112 |
| 6,345,954 B1 * | 2/2002 | Al-Himyary et al. | 415/112 |
| 6,565,095 B2 * | 5/2003 | Meacham | 277/408 |
| 2004/0179935 A1 | 9/2004 | Maguire | |

FOREIGN PATENT DOCUMENTS

JP 5065829 A 3/1993

* cited by examiner

*Primary Examiner*—Igor Kershteyn
(74) *Attorney, Agent, or Firm*—Ingrassia Fisher & Lorenz

(57) ABSTRACT

The invention relates to a system of shaft sealing for a turbine engine. Carbon-ring seals placed on pressurized bearing compartments are adapted to operate on ceramic runners which are cooled by lubricating fluid. The runners are closed at one end so that fluid does not enter an interface between the runner and the seal. The seal is held in place in a cylindrical seal housing with an inwardly projecting seal retention wall.

An internally cooled seal housing is provided having an enclosed annular cooling groove is formed in the wall. Fluid is circulated through the groove to provide cooling of the seal housing and the carbon-ring seal. The circulated fluid is provided from the same source as fluid that is circulated to lubricate bearings on the engine. However, a separately controlled fluid delivery system is employed so that a rate of flow of fluid to the seal housing can be specifically controlled. Cooling effects of circulated fluid are made available to the seal housing even though there is no fluid directed at a shaft-seal interface. Undesirable churning and fluid loss also may be reduced.

23 Claims, 4 Drawing Sheets

INTERNALLY-COOLED SEAL HOUSING FOR TURBINE ENGINE

BACKGROUND OF THE INVENTION

This invention generally relates to apparatus and methods for controlling temperature of portions of a turbine engine and more particularly, to apparatus for and a method of cooling a seal housing of a bearing compartment of such an engine.

In the construction of turbine engines, there is a need to provide robust shaft bearing systems that can tolerate operation in adverse environmental conditions. Typically, these bearing systems are exposed to high temperature environments that develop from heat produced by operation of the engine.

Turbine engines run at high rotational speeds. A lubricating fluid circulation system is employed to maintain a proper operating environment for bearings that support shafts of such engines. This fluid circulation technique mandates that bearings are housed in a sealed bearing compartment. Shaft exit regions of such bearing compartments are subject to heat buildup with a potential for deleterious coking of lubricating oil.

This re-circulating oil has an obvious beneficial effect of providing lubrication for the bearings. But, there is also a cooling function that is performed by the re-circulating oil. This cooling function prevents deterioration of the bearings which would otherwise occur at high temperatures.

In a typical aircraft turbine engine, lubricating oil is circulated through a bearing compartment at rates that exceed a gallon per minute. The oil must be pressurized in order to achieve the desired re-circulation.

In order to prevent escape of the pressurized oil from the bearing compartment, the compartment must be sealed at points where a rotating shaft passes through the compartment. It is common practice to employ a carbon-ring shaft seal to perform this sealing function. While carbon-ring shaft seals are quite effective for this sealing function, they suffer from a temperature build-up problem. Frictional interaction between the carbon-ring seal and the shaft produces localized heat. That heat, if left uncontrolled, produces coking of the lubricating oil in the region near the seal. Coking cannot be tolerated in an engine that must operate reliably for long periods of time.

This coking is a well-recognized phenomenon which has been addressed in the prior art by directing the re-circulating oil to the region where frictional heat is produced. Typically, the re-circulating oil is sprayed onto the seal-shaft interface to produce localized cooling of that region.

In some instances, additional mechanisms are used to propel fluid into a seal-shaft interface region. For example, US Application Publication 2004/0179935 A1 describes a shaft seal configuration in which a fluid jet propels fluid towards a carbon-ring seal. The fluid gathers in a weir pool and is distributed from the pool by scatter deflection and controlled leakage from the weir pool into the shaft-seal interface.

In other instances, seal supports are provided with fluid passageways that allow fluid to be pumped onto contacting surfaces of a seal. This technique is illustrated in U.S. Pat. No. 5,622,438.

These prior art approaches to heat control have some counterproductive effects. As oil is driven directly at the interface, an increased risk of oil loss develops. When a portion of the oil is diverted to flow to the seal, there is an increase in turbulence and churning. Such churning diminishes the effectiveness of the oil as a lubricant.

As can be seen, there is a need for a bearing system that reduces deleterious effects of oil loss and oil churning encountered in the prior art. More particularly, there is a need for a structure and method that provides for fluid cooling of a seal housing without directing unconstrained lubricating oil onto a shaft-seal interface.

SUMMARY OF THE INVENTION

In one aspect of the present invention a fluid-cooled seal housing for a turbine-engine bearing compartment comprises a cylindrical section with an inwardly projecting annular seal containment wall formed therein and an enclosed groove in the inwardly projecting wall. The enclosed groove is adapted for fluid communication with a circulation system for a cooling fluid.

In another aspect of the present invention, apparatus is provided for sealing against leakage from a bearing compartment with at least one rotatable shaft passing through a side thereof. The apparatus comprises an annular sealing ring, a cylindrical housing adapted to hold the annular sealing ring, and an annular seal runner surrounding a portion of the shaft and attached to the shaft at a closed end of the runner. The runner comprises an outer surface in rotatable contact with an inner surface of the sealing ring at a sealing interface. An inwardly projecting annular wall surrounds the runner and is positioned adjacent the sealing ring. The wall comprises an enclosed groove through which a cooling fluid is circulated to cool the wall.

In yet another aspect of the present invention, apparatus is provided for sealing a shaft projecting from a bearing compartment of a turbine engine. The apparatus comprises a ring seal, a cylindrical seal housing, an annular seal containment wall projecting into the seal housing, the wall being in contact with the ring seal, and a seal runner mounted on the shaft and adapted to rotate therewith. The seal runner is adapted for rotatable contact with the ring seal. The apparatus also comprises a groove formed in the annular wall through which a cooling fluid is circulated without contact between the cooling fluid and the ring seal.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention may be useful for aircraft, electrical generating equipment and other applications in which a turbine engine is employed as a power source. For illustrative purposes, the following description is of a seal housing on a bearing compartment of a turbine engine. However, it is understood that other applications can be substituted for the seal housing on a bearing compartment.

The present invention may protect a turbine engine from adverse effects of coking of oil or lubricating fluid. In the prior art, this heat build-up was reduced by spraying or splashing some of the lubricating fluid onto a shaft-seal interface. But, this produced undesirable churning and loss of fluid. The present invention may provide for heat extraction from the exit regions and thereby reduce a probability for coking of lubricating fluid. The present invention may provide for such heat extraction without introducing an undesirable churning of and loss of fluid. This is accomplished by constraining a circulating cooling fluid in an enclosed groove and precluding contact between the fluid and a seal.

Figure 1:
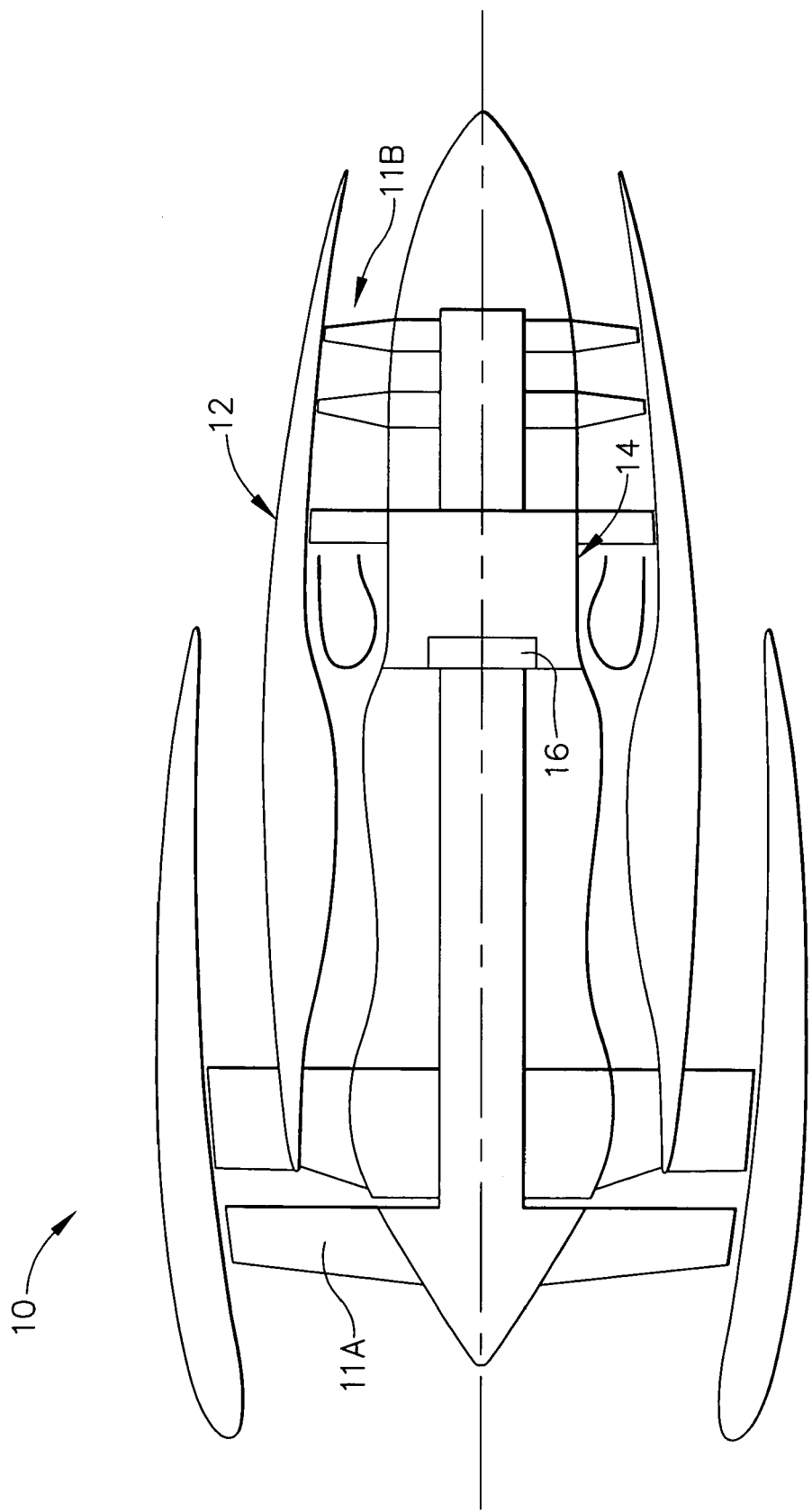
FIG. 1 is a schematic showing a cut-away view of a portion of a turbine engine, on which the present invention may have utility.

A turbine engine 10 is shown schematically in FIG. 1. The engine 10 may include a turbine a rotor 11, a static structure 12, a shaft 13, a bearing compartment 14, and a seal housing 16. The fan rotor 11A is mounted on the shaft 13 and is driven by the turbine 11B which is housed within the static structure 12. The shaft may be supported on bearings (not shown) which may be contained in the bearing compartment 14. A seal housing 16 may be positioned on the bearing compartment 14 where the shaft 13 may exit the bearing compartment 14.

Figure 2:
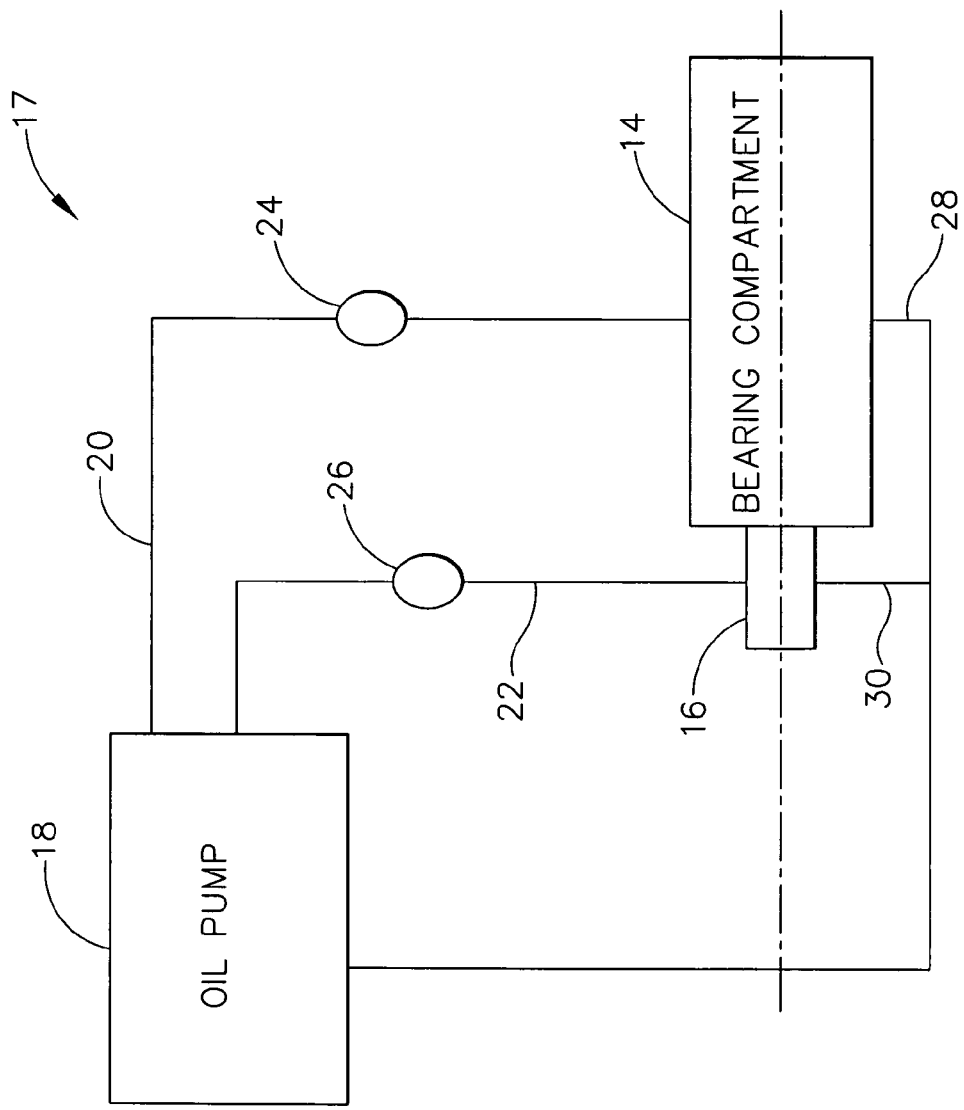
FIG. 2 is a schematic diagram of a lubricating fluid circulation system for the engine of FIG. 1, according to the present invention.

A circulation system 17 for lubricating fluid is shown schematically in FIG. 2. The lubricating fluid may perform both a lubricating and a cooling function within the bearing compartment 14. The lubricating fluid may perform a cooling function within the seal housing 16. It may be comprised of a mineral or a synthetic lubricant. The system 17 may comprise a circulation pump 18. Pump 18 may produce circulation pressure in the lubricating fluid which may flow out through fluid lines 20 and 22. A fluid line 20 may be connected to the bearing compartment 14. Fluid line 22 may deliver fluid to the seal housing 16. Each of these fluid lines may be provided with flow control devices which are designated 24 and 26 respectively. The control device 24 or 26 may be an orifice of a predetermined size or an adjusting valve.

The circulation system 17 may also comprise fluid scavenging lines 28 and 30. The scavenging line 28 may be connected to the bearing compartment 14 of FIG. 1. The scavenging line 30 may extract fluid from the seal housing 16 of FIG. 1. Each of the scavenging lines 28 and 30 may be connected to the pump 18 with conventional connections.

Figure 3:
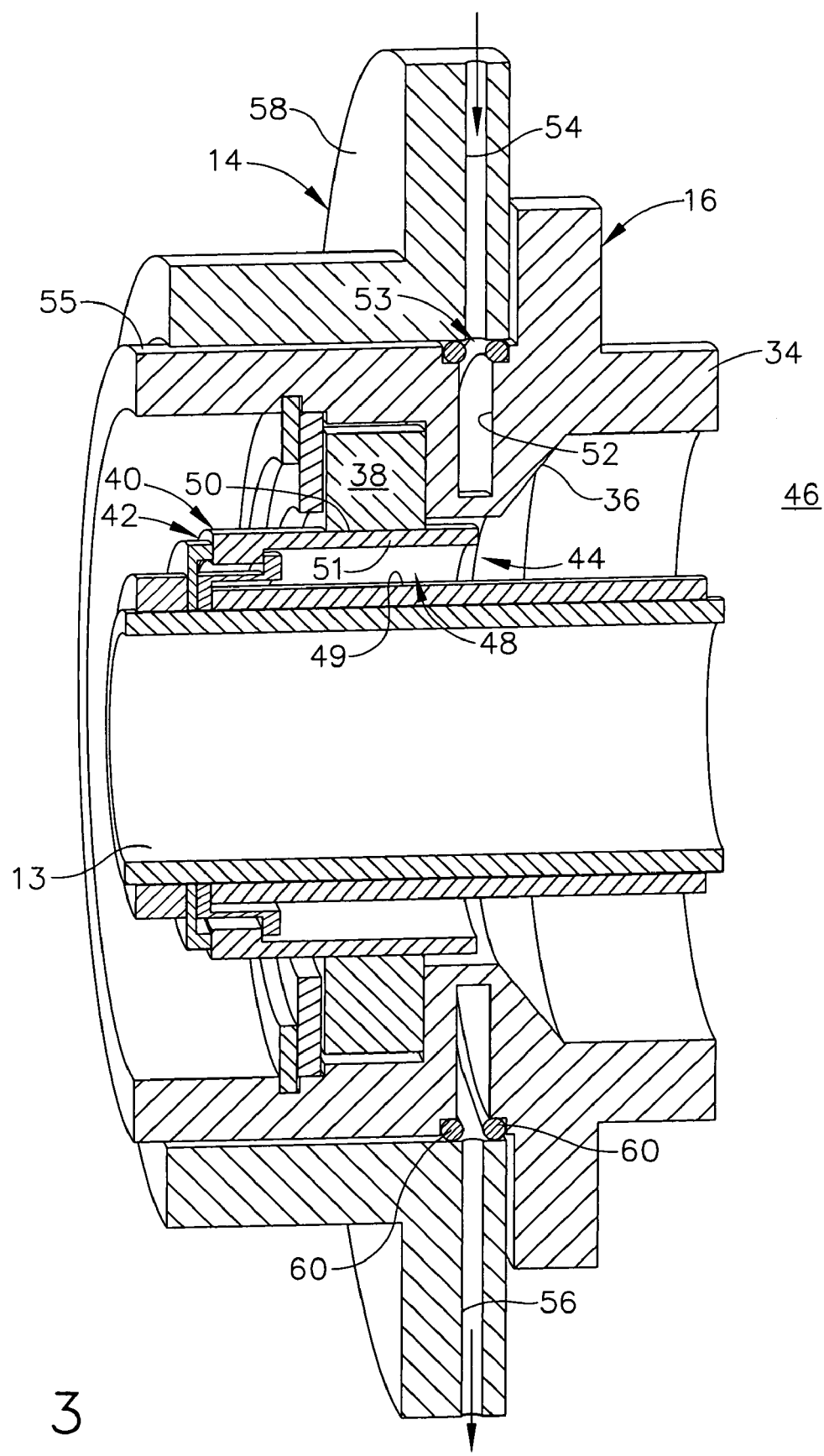
FIG. 3 is a perspective view of a cross-section of the seal housing of FIG. 1.

Referring now to FIG. 3, there is shown a detailed cross-section of the seal housing 16 and a portion of the bearing compartment 14 surrounding the shaft 13 of FIG. 1. The seal housing 16 may comprise a cylindrical section 34 with an inwardly projecting, seal containment wall 36. The seal housing 16 may be adapted to support an annular carbon-ring seal 38. The seal 38 may act to prevent escape of the lubricating fluid from the bearing compartment 14. The seal housing 16 may be positioned concentrically in the bearing compartment 14.

The seal 38 may be positioned to bear on an annular seal runner 40 which may be constructed of steel or high-strength ceramic. The seal runner 40 may be attached to the shaft 13 to rotate with the shaft. The runner 40 may have a closed end 42 and an open end 44. The open end 44 of the runner 40 may be oriented to face in a direction inwardly toward an inner side 46 of the bearing compartment 14.

The seal runner 40 may have an inner diameter that is greater than an outer diameter of the shaft 13. In other words, an annular space 48 may exist between a portion 49 of the shaft 13 and a corresponding overlying portion 51 of the runner 40. Because of the orientation of the runner 40 with respect to the bearing compartment 14, and the existence of the space 48, lubricating fluid may enter the space 48 and provide for cooling of the runner 40.

The seal 38 may be positioned to overlie the runner 40 in a region of the runner 40 which may be exposed to the cooling effects of lubricating fluid. In one embodiment, the runner 40 may be constructed from a high strength ceramic. When a ceramic structure is employed for the runner 40, there may be very little thermal expansion of the runner 40 as compared to conventional runners which are made from steel. This reduced thermal expansion may be a result of two factors. First, the ceramic runner 40 may have an innately low coefficient of expansion when compared to metals such as steel. Secondly, temperature of the runner 40 may be kept low by presence of lubricating fluid in the space 48. Low thermal expansion of the runner 40 may contribute to maintaining low radial pressure at a seal-runner interface 50. Low pressure at the interface 50 contributes to a reduced amount of frictionally produced heat at the interface 50.

All of these factors, taken together, produce a situation in which frictional heat generation is sufficiently low so as to eliminate a need for localized application of cooling fluid directly on the carbon-ring seal 38. In this regard, the configuration of the elements described above eliminates a need to operate the engine 10 in the manner of the prior art. As discussed above, prior art engines employ a spray or localized stream of re-circulated lubricating fluid to control heat build-up in carbon-ring seals. These localized applications of lubricating fluid produce undesirable churning of the fluid. Also, when lubricating fluid is specifically directed to a seal interface, there is an undesirable amount of fluid loss through the interface.

The seal housing 16 may further comprise an annular groove 52 formed in the seal housing's 16 outer surface 55. The groove 52 may be produced with a depth sufficient to permit heat conduction from the wall 36 when a cooling fluid is introduced into the groove 52.

In an embodiment of the invention shown in FIG. 3, the groove 52 may be enclosed by an overlying portion of the bearing compartment 14. This correlation of elements can result in an enclosed groove. The enclosed groove is referred to by the numeral 53. This is a convenient embodiment of the invention because the groove 52 may be produced with conventional machining methods by cutting the groove into an outer surface of the seal housing 16. Also this configuration can produce an enclosure of the groove without a need for additional parts or components. Consequently there may be simplification of an engine that employs this configuration.

In one embodiment of the present invention, the cooling fluid comprises the lubricating fluid. A single pump can deliver fluid to both the bearing compartment 14 and the seal housing 16. However, when conditions warrant, the cooling fluid may comprise some substance other than the lubricating fluid. For example, it may be more important in some applications of this invention to employ, as a cooling fluid, some substance that is a more effective coolant than the lubricating fluid. Also, the cooling fluid may be circulated from a source other than the pump 18 of FIG. 2.

In addition to the groove 52 in the wall 36, a first fluid passageway 54 and a second fluid passageway 56 may be formed in a enclosing portion 58 of the bearing compartment 14. The enclosing portion 58 may be positioned so that the first and second passageways, 54 and 56, are in fluid communication with the enclosed groove 53. The cooling fluid may be introduced through the passageway 54 to the enclosed groove 53 through the first passageway 54 to the groove 53, and extracted through the second passageway 56 from the groove 53 through the second passageway 56.

The first passageway 54 may be connected to the fluid line 22 of FIG. 2. The second passageway 56 may be connected to the fluid scavenging line 30 of FIG. 2. The passageways 54 and 56 may be disposed on opposite sides of the enclosing portion 58. In this disposition, cooling fluid may flow in through the first passageway 54, through the groove 52 and out through the second passageway 56. Cooling fluid may thus act a heat transfer medium, carrying away heat from the wall 36. In one exemplary embodiment second passageway 56 may be located 180° with respect to first passageway 54.

Annular static seals 60 may be positioned at an interface between the enclosing portion 58 of the bearing compartment 14 and the seal housing 16 to prevent lubricating fluid leakage. Alternatively, seal housing 16 may be assembled to the enclosing portion 58 with a press fit.

A convenient, easily assembled and space saving combination can result from the fluid passageways 54 and 56 being formed in the enclosing portion 58 of the bearing compartment 14. It should be understood, however, that other arrangements can be employed for introduction of the cooling fluid into an interior of the seal containment wall 36. For example, the seal housing 16 may be configured so that the fluid lines 20 and 22 are connected directly to the seal housing.

As the cooling fluid flows through the enclosed groove 53 cooling of the wall 36 occurs. The flow rate of the cooling fluid through groove 53 may be sufficient to prevent coking. The flow rate may be dependent on the amount of cooling required and/or the dimensions of the groove 53. In one exemplary embodiment, cooling fluid may have a flow rate through the groove 53 of from about 0.1 to 0.5 gallons per minute. At this flow rate, there may develop sufficient cooling to prevent coking. While a desired cooling may be produced with the present invention, undesired churning and lubricating fluid loss may also be avoided.

Figure 4:
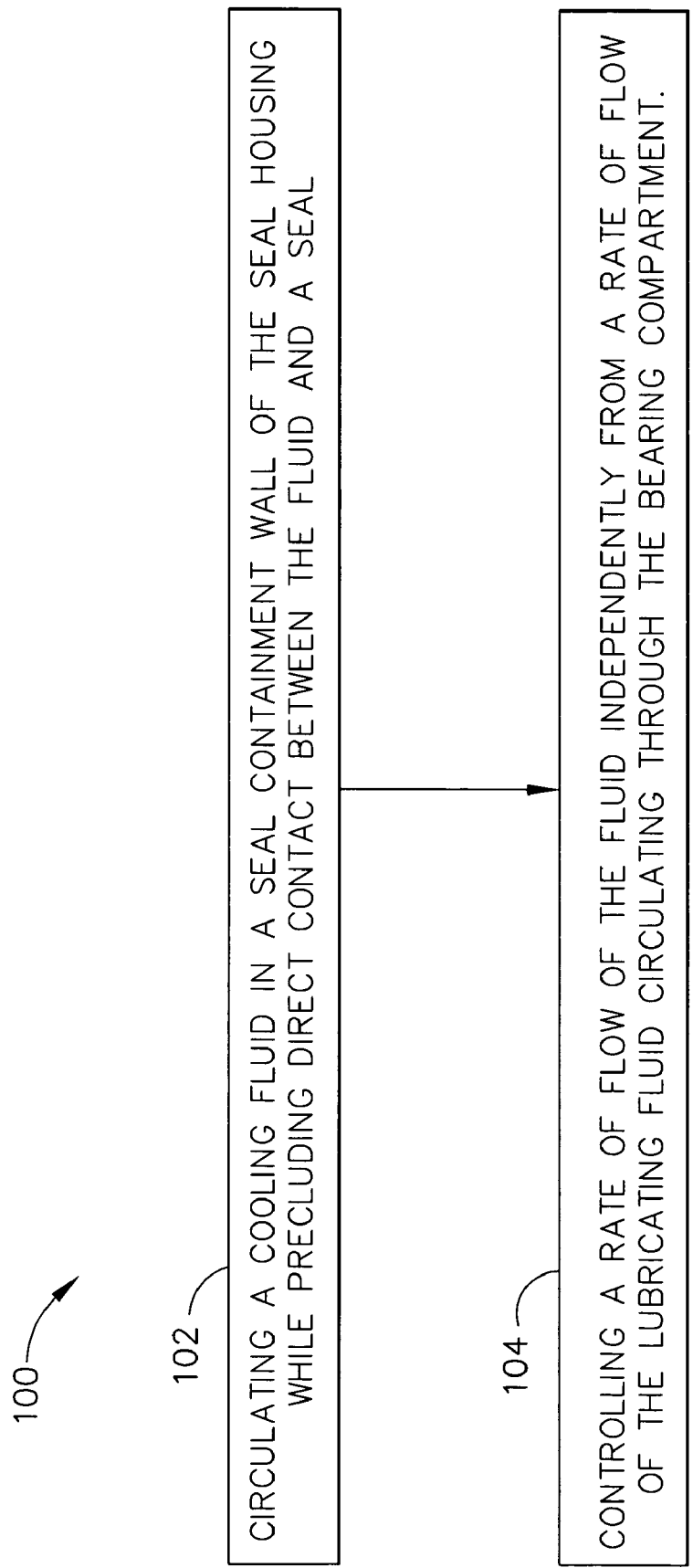
FIG. 4 is a flow chart that illustrates steps of a method of cooling in accordance with the present invention.

The present invention can now be understood to relate to a novel method for cooling the seal housing 16 of FIGS. 1 and 3 which seal housing employs the carbon-ring seal 38 to prevent fluid leakage from the bearing compartment 14. In that regard, the inventive method 100 illustrated in FIG. 4 may comprise a step 102 of directing a cooling fluid into the seal containment retaining wall 36 while precluding direct contact of the cooling fluid with a carbon-ring seal 38. In a step 104 the cooling fluid may be delivered to the wall at a rate that is controlled independently of a rate at which lubricating fluid is delivered to the bearing compartment 14 of the engine 10. Step 102 may be performed by directing the cooling fluid through the enclosed groove 53 of FIG. 3.

It should be understood, of course, that the foregoing relates to exemplary embodiments of the invention and that modifications may be made without departing from the spirit and scope of the invention as set forth in the following claims.

We claim:

1. A fluid-cooled seal housing for a turbine-engine bearing compartment comprising:
   a cylindrical section with an inwardly projecting annular seal containment wall formed therein;
   an enclosed groove in the inwardly projecting wall; and
   the enclosed groove adapted for fluid communication with a circulation system for a cooling fluid, the cooling fluid comprising a lubricating fluid of the same type as that used to lubricate bearings within the bearing compartment.

2. The seal housing of claim 1 wherein: the seal housing is concentrically positioned on the bearing compartment.

3. The apparatus of claim 2 wherein fluid passageways are formed in the bearing compartment and provide fluid communication between the groove and the cooling fluid circulation system.

4. The apparatus of claim 3 wherein: a first passageway is adapted to introduce cooling fluid to the groove; a second passageway is adapted to remove cooling fluid from the groove; and the first and second passageways are disposed at about 180° from each other around a circumference of the seal housing.

5. The seal housing of claim 1 wherein: the enclosed groove is comprised of an annular groove extending through an outer surface of the seal housing and an enclosing portion of the bearing compartment.

6. The apparatus of claim 5 wherein static seals are positioned between the outer surface of the seal housing and the bearing compartment, the static seals being disposed on each side of the groove.

7. The apparatus of claim 5 wherein the seal housing and the bearing compartment are engaged with a press fit.

8. The apparatus of claim 1 wherein a flow of the lubricating fluid through the enclosed groove is controlled independently from a flow of the lubricating fluid through the bearing compartment.

9. The apparatus of claim 8 wherein the flow of lubricating fluid through the enclosed groove is between about 0.1 to 0.5 gallons per minute.

10. The apparatus of claim 8 wherein the flow rate of lubricating fluid through the enclosed groove is between about 5 to 50 of a flow rate of the lubricating fluid through the bearing compartment.

11. An apparatus for sealing against leakage from a bearing compartment with at least one a rotatable shaft passing through a side thereof, the apparatus comprising:
    an annular sealing ring;
    a cylindrical housing adapted to hold the annular sealing ring;
    an annular seal runner surrounding a portion of the shaft and attached to the shaft at a closed end of the annular seal runner;
    the annular seal runner comprising an outer surface in rotatable contact with an inner surface of the sealing ring at a sealing interface;
    an inwardly projecting annular wall surrounding the annular seal runner and positioned adjacent the sealing ring; and
    the wall comprising an enclosed groove through which a cooling fluid is circulated to cool the wall, the cooling fluid comprising a lubricating fluid of the same type as that used to lubricate bearings within the bearing compartment.

12. The apparatus of claim 11 wherein the enclosed groove is comprised of: an annular groove that communicates with an outer surface of the cylindrical housing, and an inner surface of a cylindrical member into which the cylindrical housing is concentrically positioned.

13. The apparatus of claim 12 wherein the cylindrical seal housing is concentrically positioned in a portion of the bearing compartment so that the annular groove is enclosed by the portion.

14. The apparatus of claim 13 wherein static seals are positioned between the bearing compartment and the cylindrical seal housing.

15. The apparatus of claim 13 wherein the cylindrical seal housing and bearing compartment are engaged with a press fit.

16. The apparatus of claim 11 wherein a flow of the lubricating fluid through the enclosed groove is controlled independently from a flow of the lubricating fluid.

17. An apparatus for sealing a shaft projecting from a bearing compartment of a turbine engine which comprises:
   a ring seal;
   a cylindrical seal housing;
   an annular seal containment wall projecting into the seal housing, the wall being in contact with the ring seal;
   a seal runner mounted on the shaft and adapted to rotate therewith;
   the seal runner being adapted for rotatable contact with the ring seal; and
   a groove formed in the annular wall through which a cooling fluid is circulated without contact between the cooling fluid and the ring seal.

18. The apparatus of claim 17 wherein the sealing ring comprises carbon.

19. The apparatus of claim 17 wherein the runner comprises ceramic.

20. The apparatus of claim 17 wherein the runner has an inside diameter larger than an outside diameter of the shaft at an open end of the runner, whereby lubricating fluid within the bearing compartment contacts an inner bore of the runner under a portion of the runner that is in rotatable contact with the sealing ring.

21. The apparatus of claim 17 wherein the cooling fluid circulated through the groove comprises a lubricating fluid of the same type as that used to lubricate bearings within the bearing compartment.

22. The apparatus of claim 21 which further comprises a controller for a flow rate of lubricating fluid through the seal containment wall, which controller is adapted to provide a flow rate for the fluid independently from a flow rate of lubricating fluid circulating through the bearing compartment.

23. The apparatus of claim 22 wherein the controller is an orifice of a predetermined size.

* * * * *

UNITED STATES PATENT AND TRADEMARK OFFICE
CERTIFICATE OF CORRECTION

PATENT NO. : 7,410,341 B2 Page 1 of 1
APPLICATION NO. : 11/159453
DATED : August 12, 2008
INVENTOR(S) : Richard R. Gockel et al.

It is certified that error appears in the above-identified patent and that said Letters Patent is hereby corrected as shown below:

Column 6, line 30, "5 to 50" should be changed to --5% to 50%--

Signed and Sealed this

Thirteenth Day of January, 2009

JON W. DUDAS
*Director of the United States Patent and Trademark Office*